United States Patent
Park

(10) Patent No.: US 7,995,571 B2
(45) Date of Patent: Aug. 9, 2011

(54) SYSTEM FOR PROVIDING TUNNEL SERVICE CAPABLE OF DATA COMMUNICATION BETWEEN DIFFERENT TYPES OF NETWORKS

(75) Inventor: Soo-hong Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1410 days.

(21) Appl. No.: 10/972,428

(22) Filed: Oct. 26, 2004

(65) Prior Publication Data
US 2005/0094575 A1    May 5, 2005

Related U.S. Application Data

(60) Provisional application No. 60/515,669, filed on Oct. 31, 2003.

(30) Foreign Application Priority Data

Nov. 11, 2003  (KR) .................. 10-2003-0079589

(51) Int. Cl.
H04L 12/56  (2006.01)
(52) U.S. Cl. ...... 370/389; 370/466; 370/529; 370/395.2
(58) Field of Classification Search .................. 370/229, 370/230, 231, 254, 466, 389, 392, 397, 399, 370/395.2, 395.3, 409, 529, 475
See application file for complete search history.

(56) References Cited

U.S. PATENT DOCUMENTS

| | | | |
|---|---|---|---|
| 6,614,809 B1 * | 9/2003 | Verma et al. | 370/469 |
| 6,654,792 B1 * | 11/2003 | Verma et al. | 709/208 |
| 6,931,016 B1 * | 8/2005 | Andersson et al. | 370/401 |
| 6,993,037 B2 * | 1/2006 | Boden et al. | 370/401 |
| 7,116,681 B1 * | 10/2006 | Hovell et al. | 370/466 |
| 7,188,191 B1 * | 3/2007 | Hovell et al. | 709/245 |
| 7,299,301 B1 * | 11/2007 | Verma et al. | 709/249 |
| 7,305,481 B2 * | 12/2007 | Blanchet et al. | 709/230 |
| 7,321,577 B2 * | 1/2008 | Shimizu et al. | 370/338 |

(Continued)

FOREIGN PATENT DOCUMENTS

WO    WO 01/54437 A1    7/2001

(Continued)

OTHER PUBLICATIONS

RFC2131, Dynamic Host Configuration, Mar. 1997.*

(Continued)

*Primary Examiner* — Kwang B Yao
*Assistant Examiner* — Nguyen Ngo
(74) *Attorney, Agent, or Firm* — Staas & Halsey LLP

(57) ABSTRACT

A system providing a tunnel service capable of data communication between different types of networks. A method of setting an address of a tunnel router in a user node includes: transmitting a message requesting at least one tunnel router address to a tunnel service support server; receiving a message including at least one tunnel router address from the tunnel service support server; and storing the tunnel router address included in the received message. According to the system and method, the address of a tunnel router providing a tunnel service to a user node can be more easily set, and even when the address of the tunnel router changes or a new tunnel router is added, the address of the tunnel router can be easily set without the user manually changing the address of the tunnel router.

37 Claims, 6 Drawing Sheets

U.S. PATENT DOCUMENTS

| | | | |
|---|---|---|---|
| 7,321,598 B2* | 1/2008 | Blanchet et al. | 370/466 |
| 7,366,188 B2* | 4/2008 | Kim | 370/401 |
| 2001/0017856 A1* | 8/2001 | Asokan et al. | 370/389 |
| 2002/0065921 A1* | 5/2002 | Davidson et al. | 709/227 |
| 2002/0172175 A1* | 11/2002 | Okamura | 370/338 |
| 2003/0005328 A1* | 1/2003 | Grewal et al. | 713/201 |
| 2003/0224792 A1* | 12/2003 | Verma et al. | 455/436 |
| 2004/0088385 A1* | 5/2004 | Blanchet et al. | 709/220 |
| 2004/0148439 A1* | 7/2004 | Harvey et al. | 709/249 |
| 2004/0199666 A1* | 10/2004 | King et al. | 709/238 |
| 2004/0205188 A1* | 10/2004 | Ahlard et al. | 709/224 |
| 2004/0236855 A1* | 11/2004 | Peles | 709/227 |
| 2005/0066041 A1* | 3/2005 | Chin et al. | 709/228 |
| 2005/0188065 A1* | 8/2005 | O'Rourke et al. | 709/223 |
| 2006/0020688 A1* | 1/2006 | Chang et al. | 709/219 |
| 2006/0092964 A1* | 5/2006 | Park et al. | 370/437 |

FOREIGN PATENT DOCUMENTS

| | | |
|---|---|---|
| WO | WO 02/103978 A2 | 12/2002 |
| WO | WO 03/032604 A1 | 4/2003 |
| WO | WO 03/065682 A1 | 8/2003 |

OTHER PUBLICATIONS

Written Opinion mailed Jan. 27, 2005, for corresponding International application No. PCT/KR2004/002720.

* cited by examiner

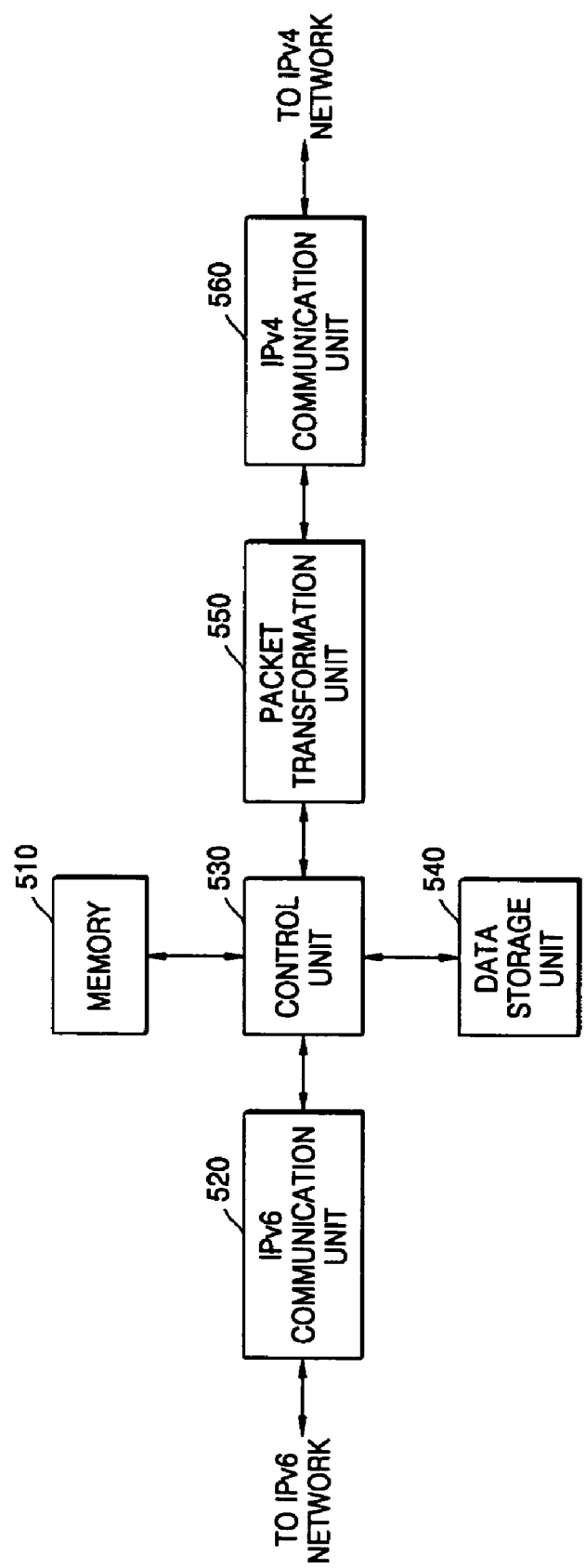

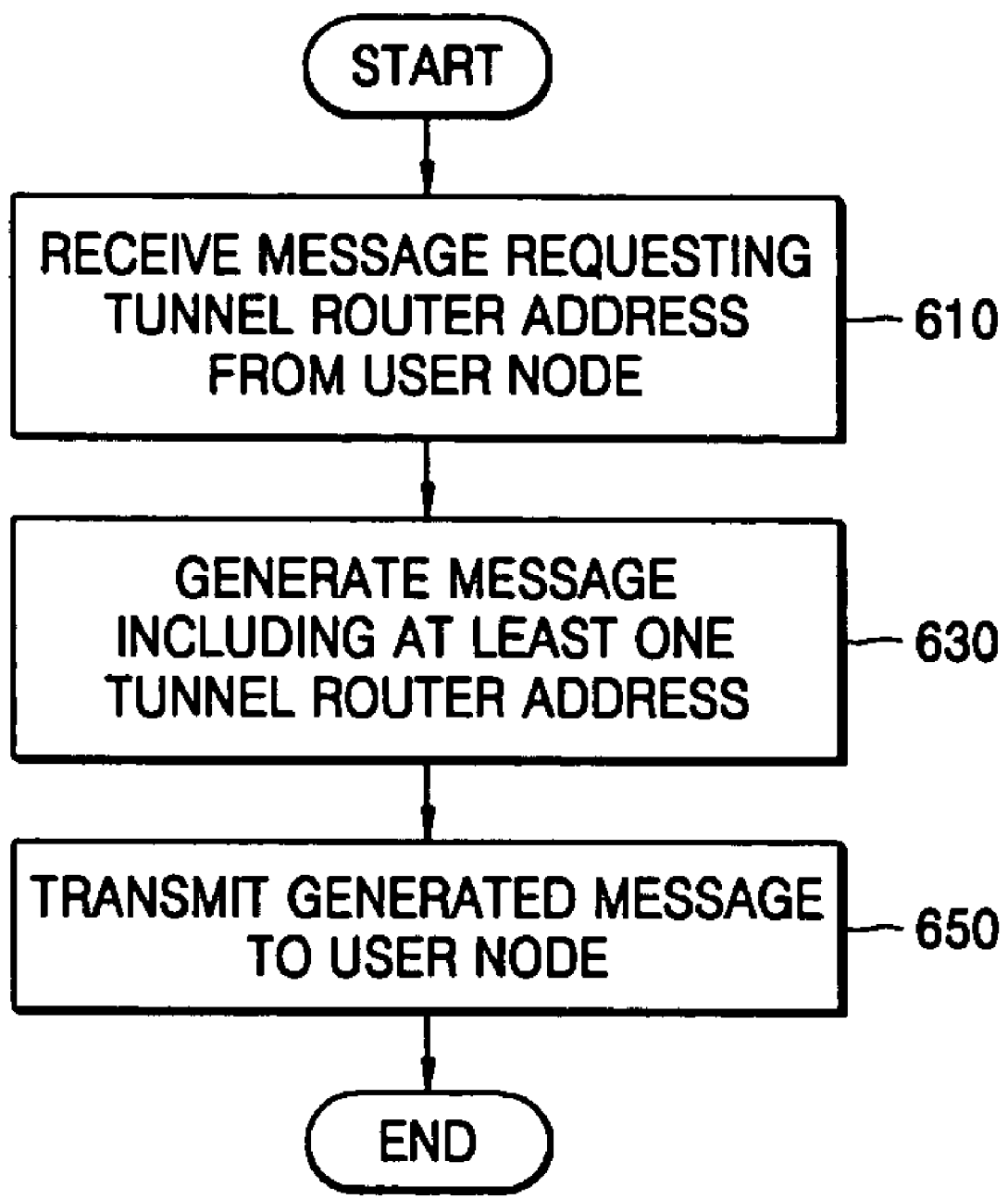

SYSTEM FOR PROVIDING TUNNEL SERVICE CAPABLE OF DATA COMMUNICATION BETWEEN DIFFERENT TYPES OF NETWORKS

CROSS-REFERENCE TO RELATED APPLICATIONS

This application claims the priority of U.S. provisional application No. 60/515,669, filed on Oct. 31, 2003, and Korean Patent Application No. 2003-79589, filed on Nov. 11, 2003 in the Korean Intellectual Property Office, the disclosure of which is incorporated herein in its entirety by reference.

BACKGROUND OF THE INVENTION

1. Field of the Invention

The present invention relates to a tunnel service system enabling data communication between different types of networks, and more particularly, to a tunnel service system capable of more easily setting an address of a tunnel router providing a tunnel service to a user node.

2. Description of the Related Art

In order to improve the conventional Internet protocol version 4 (IPv4), Internet protocol version 6 (IPv6) is being developed. IPv6 is also referred to as a next generation IP.

One of major characteristics of the IPv6 is that the length of an IP address is extended to 128 bits from the conventional 32 bits to prevent a possible shortage of IP addresses with the rapid growth of the Internet. Also, with the extension of a header area, the IPv6 allows designation of a mechanism for authentication of the source of a packet, guaranteeing data integrity, and guaranteeing security.

FIG. 1 is a schematic diagram of a conventional tunnel service providing system. Any of a user node 110 and a destination node 160 shown in FIG. 1 is a node having the IPv6 function, and is a mobile node such as a notebook computer or a personal digital assistant (PDA), or a non-mobile node with a fixed location such as a desktop computer.

In order for the user node 110 located on a first IPv6 network 100 to transmit a packet to the destination node 160 located on a second IPv6 network 150 through an IPv4 network 130, a tunnel between the user node 110 and the destination node 160 should be established. Establishing a tunnel between the user node 110 and the destination node 160 is referred to as a tunnel service. The tunnel service is provided to transmit an IPv6 packet generated by the user node 110 supporting the IPv6 to the destination node 160 through the IPv4 network.

More specifically, an IPv6 packet generated by the user node 110 is transmitted to a first tunnel router 120. The first tunnel router 120 encapsulates the received IPv6 packet so that the packet can be transmitted to the destination node 160 through the IPv4 network 130.

FIG. 2 is a diagram showing a conventional encapsulation process. Referring to FIG. 2, the IPv6 packet 180 includes the address of the destination node 160 that is the destination address, the address of the user node 110 that is the home address where the packet is generated, and data. In order to transmit the IPv6 packet 180 to the destination node 160 through the IPv4 network 130 and a second tunnel router 140, the first tunnel router 120 generates an IPv4 packet 190 by adding addresses of the second tunnel router 140 and the first tunnel router 120, having an IP address format complying with IPv4, to the IPv6 packet 180. This process is referred to as encapsulation and the inverse process is referred to as decapsulation. The IPv4 packet 190 is decapsulated by the second tunnel router 140 and then is transmitted to the destination node 160.

According to the conventional technology, the address of the first tunnel router 120 providing a tunnel service should be directly set in the user node 110.

In addition, when the address of the first tunnel router 120 changes or a new tunnel router is installed, the user should directly set the changed or new tunnel router address in the user node.

SUMMARY OF THE INVENTION

In accordance with an aspect of the present invention, a method of setting the address of a tunnel router by which the address of the tunnel router providing a tunnel service to a user node can be more easily set, and a node setting the address of a tunnel router using the method are provided.

In accordance with an aspect of the present invention, a method of setting the address of a tunnel router by which the address of the tunnel router providing a tunnel service to a user node can be more easily set, and a tunnel service support server providing the address of a tunnel router to a user node by using the method are provided.

According to an aspect of the present invention, there is provided a method of setting an address of a tunnel router providing a tunneling function in a user node, the method including: transmitting a message requesting at least one tunnel router address to a tunnel service support server; receiving a message including at least one tunnel router address from the tunnel service support server; and storing the tunnel router address included in the received message.

According to another aspect of the present invention, there is provided a node setting an address of a tunnel router providing a tunneling function, the node including: a data storage unit; a communication unit which transmits a message requesting a tunnel service support server for at least one tunnel router address; and a control unit which receives the message, which includes at least one tunnel router address and is received by the communication unit from the tunnel service support server, from the communication unit, and stores the address of the tunnel router included in the received message in the data storage unit.

According to another aspect of the present invention, there is provided a method of providing an address of a tunnel router providing a tunneling function to a user node, in a tunnel service support server, the method including: receiving a message requesting at least one tunnel router address from the user node; generating a message including the at least one tunnel router address; and transmitting the generated message to the user node.

According to another aspect of the present invention, there is provided a tunnel service support server providing an address of a tunnel router providing a tunneling function to a user node, the tunnel service support server including: a data storage unit which stores at least one tunnel router address; a communication unit which receives a message requesting at least one tunnel router address from the user node; and a control unit which according to the message input from the communication unit, reads the at least one tunnel router address stored in the data storage unit, generates a message including the at least one tunnel router address, and controls the communication unit such that the message including the at least one tunnel router address is transmitted to the user node.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 8 is a block diagram of an example of a tunnel service support server according to an embodiment of the present invention shown in FIG. 5; and FIG. 9 is a flowchart of the operations performed by an example of a method of providing a tunnel router address according to an embodiment of the present invention.

DETAILED DESCRIPTION OF THE EMBODIMENTS

Figure 1:
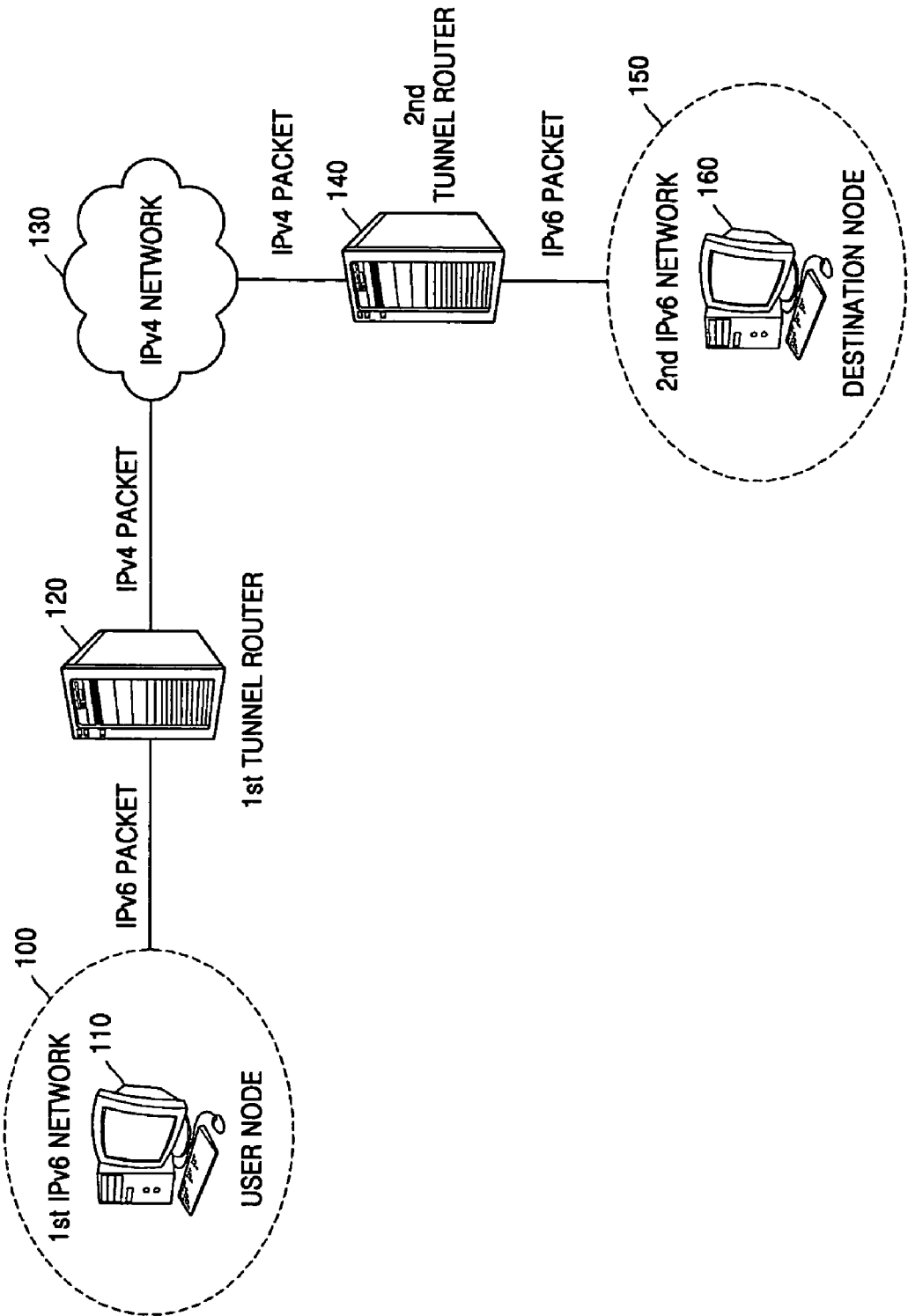
FIG. 1 is a schematic diagram of a conventional tunnel service providing system.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
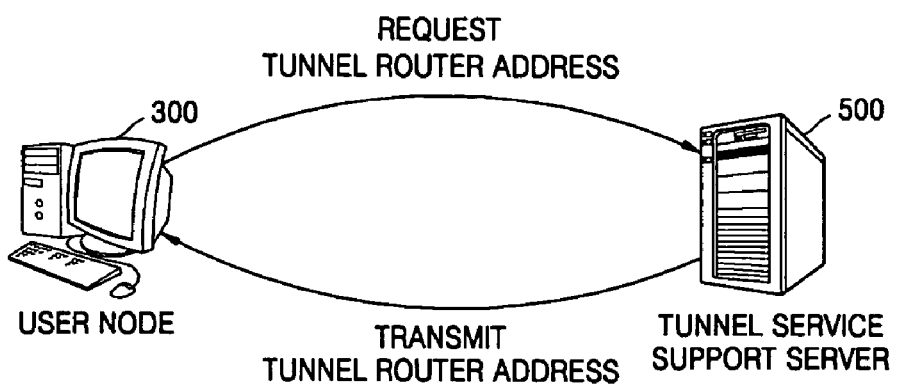
FIG. 3 is a schematic diagram of a tunnel service providing system according to an embodiment of the present invention.

Referring to FIG. 3, a tunnel service providing system according to an embodiment of the present invention includes a user node 300 having an IPv6 function and a tunnel service support server 500.

The user node is a node having the IPv6 function, and is a mobile node such as a notebook computer or a PDA, or a non-mobile node with a fixed location such as a desktop computer.

The tunnel service support server 500 is a server providing the address of a tunnel router (not shown) providing a tunnel service to the user node 300 and has a function of dynamic host configuration protocol version 6 (DHCPv6) or neighbor discovery for Internet protocol version 6 (NDIPv6).

In embodiments of the present invention, new option information is defined by using the DHCPv6 or router advertisement (RA) provided by the NDIPv6. By transmitting an IPv6 address and other information to a node, the server with the DHCPv6 function automatically sets the node so that the node with an IPv6 function can communicate data through an IPv6 network. A router with an RA function provided by the NDIPv6 transmits prefix information and other information required to generate an IPv6 address to the node.

By using the new option information, the tunnel service support server 500 generates a message including the address of a tunnel router and transmits the message to the user node 300. The user node 300 receives the message including the address of the tunnel router from the tunnel service support server 500, extracts the address of the tunnel router from the message and stores it.

Figure 4:
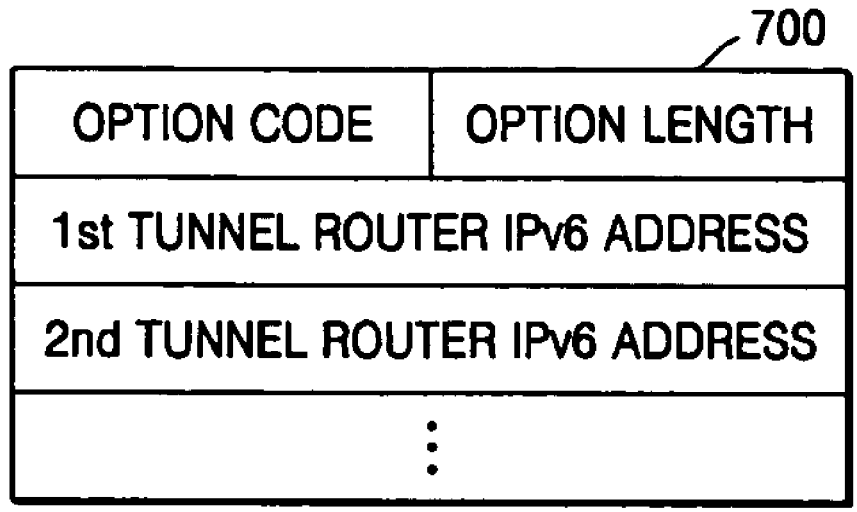
FIG. 4 is a diagram showing an example of a message including a tunnel router address generated by a tunnel service support server.

FIG. 4 is a diagram showing a message 700 including a tunnel router address generated by the tunnel service support server 500 by using the option information defined in the DHCPv6. The message 700 shown in FIG. 4 includes an option code indicating the type of information and indicating that the information included in the message 700 is the address of a tunnel router, an option length indicating the length of the option information included in the message 700, and at least one or more tunnel router addresses. When the number of tunnel routers providing a tunnel service to the user node 300 is plural, the tunnel service support server 500 writes the addresses of respective tunnel routers in the message 700 according to the priorities that respective tunnel routers are providing tunnel services to the user node 300.

Figure 5:
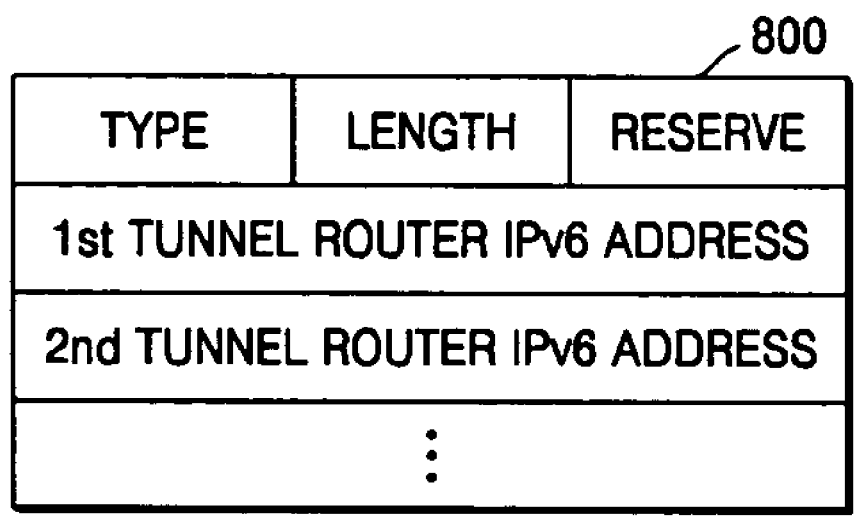
FIG. 5 is a diagram showing another example of a message including a tunnel router address generated by a tunnel service support server.

FIG. 5 is a diagram showing a message 800 including a tunnel router address generated by the tunnel service support server 500 by using option information defined in the RA provided by the NDIPv6. The message 800 shown in FIG. 5 includes "Type" information indicating the type of information and indicating that the information included in the message is the address of a tunnel router, "length" information on the length of the option information included in the message, and at least one or more tunnel router addresses. When the number of tunnel routers providing a tunnel service to the user node 300 is plural, the tunnel service support server 500 writes the addresses of respective tunnel routers in the message 800 according to the priorities that respective tunnel routers are providing tunnel services to the user node 300.

Figure 6:
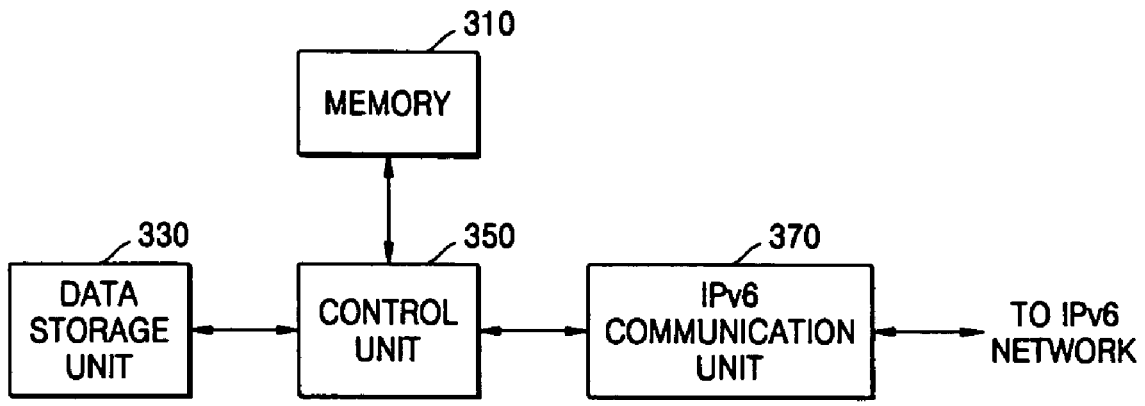
FIG. 6 is a block diagram of an example of a node according to an embodiment of the present invention shown in FIG. 3.

FIG. 6 is a block diagram of an example of the user node 300 according to an embodiment of the present invention shown in FIG. 3. Referring to FIG. 6, the user node 300 includes a memory 310, a data storage unit 330, a control unit 350, and an IPv6 communication unit 370.

In the memory 310, IPv6, DHCPv6 or RA applications for the user node 300 to perform data communication through an IPv6 network are loaded. In the data storage unit 330, at least one tunnel router address included in the message received from the tunnel service support server 500 is stored. The IPv6 communication unit 310 serves as a transceiver for the message and data communications with the IPv6 network.

The control unit 350 controls the memory 310, the data storage unit 330, and the IPv6 communication unit 370 to perform the method of setting the address of a tunnel router according to an embodiment of the present invention.

A method of setting the address of a tunnel router according to an embodiment of the present invention will now be explained based on the structure of the node 300 illustrated in FIG. 6.

Figure 7:
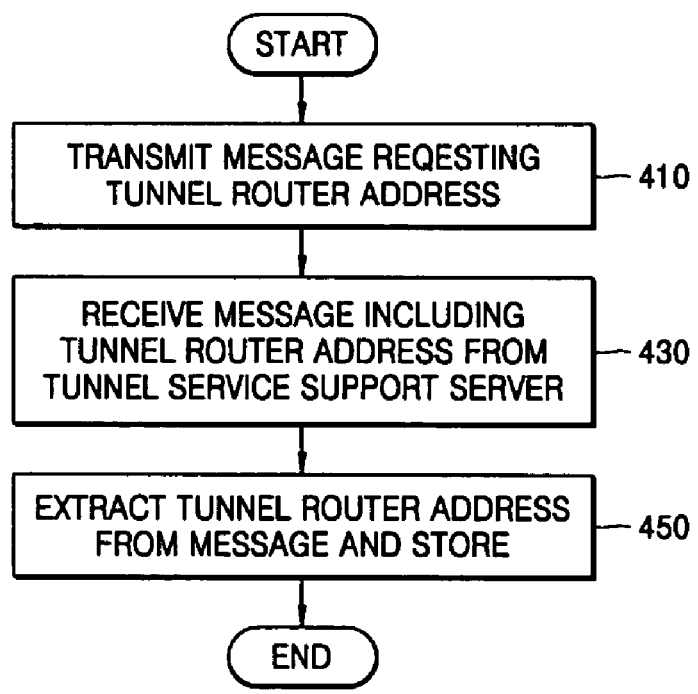
FIG. 7 is a flowchart of the operations performed by an example of a method of setting a tunnel router address according to an embodiment of the present invention.

FIG. 7 is a flowchart of the operations performed by an example of a method of setting a tunnel router address according to an embodiment of the present invention.

According to control of the control unit 350, the IPv6 communication unit 370 transmits a message requesting the address of at least one tunnel router, to the tunnel service support server 500 in operation 400. In a case where the tunnel service support server 500 generates a message including the address of a tunnel router by using option information of the DHCPv6 and then transmits the message to the user node 300, the control unit 350 generates a request message requesting the address of a tunnel router by using the DHCPv6. However, in a case where the tunnel service support server 500 generates a message including the address of a tunnel router by using option information of the RA and then transmits the message to the user node 300, the control unit 350 requests the address of a tunnel router by using a router solicitation message.

The IPv6 communication unit 370 receives the message including at least one tunnel router address from the tunnel server support server 500 in operation 430. The message including the tunnel router address received by the user node 300 is as shown in FIG. 4 or 5.

The control unit 350 receives the message including the tunnel router address from the IPv6 communication unit 370, extracts the tunnel router address from the message, and stores the address in the data storage unit 330 in operation 450. Then, the user node 300 can transmit an IPv6 packet desired to be transmitted, to the tunnel router by using the tunnel router address stored in the data storage unit 330. The tunnel router, which receives the IPv6 packet from the user node 300, encapsulates the IPv6 packet to generate an IPv4 packet, and then transfers the IPv4 packet to the IPv4 network.

FIG. 8 is a more detailed block diagram of an example of the tunnel service support server 500 shown in FIG. 3.

In a case where the tunnel service support server 500 according to an embodiment of the present invention has the DHCPv6 function and by using the option information of the DHCPv6, generates a message including the address of the tunnel router and then, transmits the message to the user node 300, the tunnel service support server 500 can be implemented as a DHCPv6 server in the IPv6 network in which the user node 300 is located, or as a router with the DHCPv6 function that is a tunnel router providing a tunnel service to the user node 300.

Meanwhile, in a case where the tunnel service support server 500 has the RA function and by using the option information of the RA, generates an RA message including the tunnel router address, and then transmits the RA message to the user node 300, the tunnel service support server 500 can be implemented as a tunnel router providing a tunnel service to the user node 300.

Referring to FIG. 8, the tunnel service support server 500 includes a memory 510, an IPv6 communication unit 520, a control unit 530, a data storage unit 540, a packet transformation unit 550, and an IPv4 communication unit 560.

In the memory 510, IPv6, IPv4, DHCPv6, or RA applications for the tunnel service support server 500 to perform data communication through an IPv6 network, or an IPv4 network are loaded. In the data storage unit 540, at least one tunnel router address capable of providing a tunnel service to the user node 300 is stored.

Figure 2:
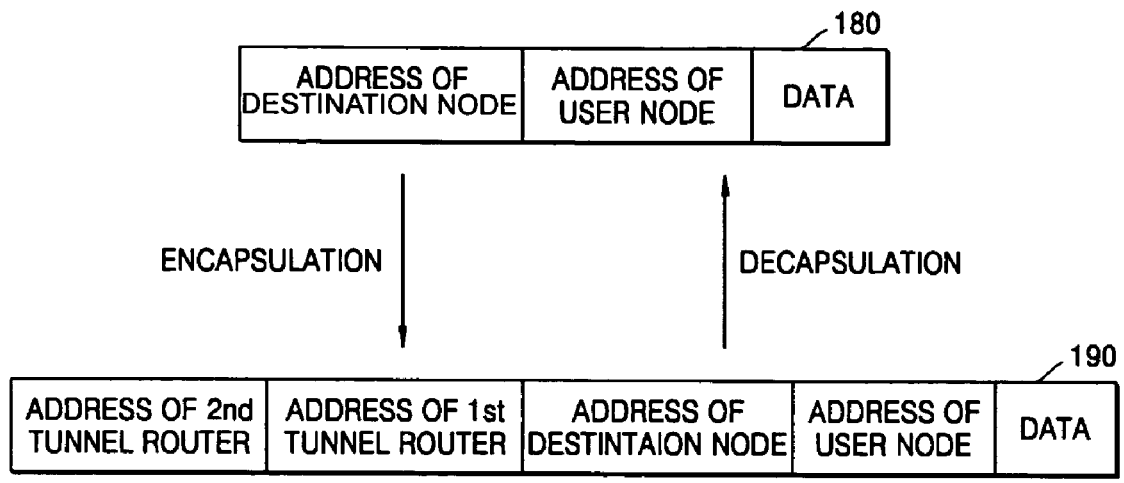
FIG. 2 is a diagram showing a conventional encapsulation and decapsulation process.

The IPv6 communication unit 520 and the IPv4 communication unit 560 perform communications with an IPv6 network and an IPv4 network, respectively, according to control of the control unit 560. The packet transformation unit 550 performs encapsulation or decapsulation as shown in FIG. 2.

The control unit 530 controls the memory 510, the IPv6 communication unit 520, the data storage unit 540, the packet transformation unit 550 and the IPv4 communication unit 560 to perform the method of providing the address of a tunnel router according to an embodiment of the present invention.

The method of providing the address of a tunnel router according to an embodiment of the present invention will now be explained based on the structure of the tunnel service support server 500 shown in FIG. 8.

FIG. 9 is a flowchart of the operations performed by an example of a method of providing a tunnel router address to a user node according to an embodiment of the present invention.

The IPv6 communication unit 520 receives a message requesting at least one tunnel router address from the user node 300 in operation 610. The message requesting a tunnel router address is generated by the user node 300 according to the DHCPv6 or the NDIPv6.

The control unit 530 reads at least one tunnel router address stored in the data storage unit 540, and generates a message including the at least one tunnel router address in operation 630.

When the tunnel service support server 500 is a DHCPv6 server or a router with the DHCPv6 function, a message including the tunnel router address is generated by using the option information of the DHCPv6 as shown in FIG. 4. Meanwhile, when the tunnel service support server 500 is a tunnel router with the RA function, a message including the tunnel router address is generated by using the option information of the RA as shown in FIG. 5.

The control unit 530 transmits the message generated in the IPv6 communication unit 520 to the user node 300 in operation 650.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to aspects of the present invention as described above, the address of a tunnel router providing a tunnel service to a user node can be more easily set, and even when the address of the tunnel router changes or a new tunnel router is added, the address of the tunnel router can be easily set without the user manually changing the address of the tunnel router.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of setting an address of at least one tunnel router providing a tunneling function in a user node, the method comprising:

transmitting, by and originating from the user node, a first message requesting at least one tunnel router address corresponding to the at least one tunnel router to a tunnel service support server;

receiving, by the user node, a second message including at least one tunnel router address from the tunnel service support server; and storing the tunnel router address included in the received second message, wherein packets to be tunneled to the at least one tunnel router originate from the user node, wherein the tunnel service support server provides at least one tunnel router address, as an address of a corresponding tunnel router different from an address of the user node, providing a tunnel service to the user node based on the address of the user node, and wherein the user node is a node supporting Internet protocol version 6 (IPv6) function, wherein when two or more tunnel router addresses are included in the second message received from the tunnel service support server, the two or more addresses of tunnel routers are sequentially recorded in the second message according to priorities of the two or more tunnel routers.

2. The method of claim 1, wherein the second message including the tunnel router address includes at least type information indicating a type of option information included in the second message, and length information indicating a length of the option information.

3. The method of claim 1, wherein the tunnel service server is one of the at least one tunnel router.

4. The method of claim 1, wherein the second message including the tunnel router address is generated by using an option provided by dynamic host configuration protocol version 6 (DHCPv6).

5. The method of claim 1, wherein the second message including the tunnel router address is generated by using Router Advertisement option provided by neighbor discovery for Internet protocol version 6 (NDIPv6).

6. The method of claim 1, wherein the at least one tunnel router is a router transforming a packet generated by the user node and complying with the IPv6, into another packet complying with a protocol different from the IPv6.

7. A method of setting an address of at least one tunnel router providing a tunneling function in a user node, the method comprising:

transmitting, by and originating from the user node, a first message requesting at least one tunnel router address corresponding to the at least one tunnel router to a tunnel service support server;

receiving, by the user node, a second message including at least one tunnel router address from the tunnel service support server; and storing the tunnel router address included in the received second message, wherein packets to be tunneled to the at least one tunnel router originate from the user node, wherein the tunnel service support server provides at least one tunnel router address providing a tunnel service to the user node, and wherein the user node is a node supporting Internet protocol version 6 (IPv6) function, wherein when two or more tunnel router addresses are included in the second message received from the tunnel service support server, the two or more addresses of tunnel routers are sequentially recorded in the second message according to priorities of the two or more tunnel routers.

8. A node setting an address of at least one tunnel router providing a tunneling function, the node comprising:

a data storage unit;

a communication unit which originates and transmits a message requesting a tunnel service support server to provide at least one tunnel router address corresponding to the at least one tunnel router; and a control unit which receives a response to the message, the response includes at least one tunnel router address and is received by the communication unit from the tunnel service support server, from the communication unit, and stores the address of the tunnel router included in the received message in the data storage unit, wherein packets to be tunneled to the at least one tunnel router originate from the node, wherein the tunnel service support server provides at least one tunnel router address, as an address of a corresponding tunnel router different from an address of the user node, providing a tunnel service to the user node based on the address of the user node, and wherein the node is a user node supporting Internet protocol version 6 (IPv6) function, wherein when two or more tunnel router addresses are included in the response from the tunnel service support server, the two or more addresses of tunnel routers are sequentially recorded in the response according to priorities of the two or more tunnel routers.

9. The node of claim 8, wherein the response including the tunnel router address includes at least type information indicating a type of option information included in the response, and length information indicating a length of the option information.

10. The node of claim 8, wherein the tunnel service server is one of the at least one tunnel router.

11. The node of claim 8, wherein the response including the at least one tunnel router address is generated by using an option provided by dynamic host configuration protocol version 6 (DHCPv6).

12. The node of claim 8, wherein the response including the at least one tunnel router address is generated by using a Router Advertisement option provided by neighbor discovery for Internet protocol version 6 (NDIPv6).

13. The node of claim 8, wherein the at least one tunnel router is a router transforming a packet generated by the user node and complying with the IPv6, into another packet complying with a protocol different from the IPv6.

14. A method of providing an address of at least one tunnel router providing a tunneling function to a user node, in a tunnel service support server, the method comprising:

receiving a first message requesting at least one tunnel router address by and originating from the user node;

generating a second message including the at least one tunnel router address; and transmitting the generated second message to the user node, wherein packets to be tunneled to the at least one tunnel router originate from the user node, wherein the tunnel service support server provides at least one tunnel router address, as an address of a corresponding tunnel router different from an address of the user node, providing a tunnel service to the user node based on the address of the user node, and wherein the user node is a node supporting Internet protocol version 6 (IPv6) function, wherein when two or more tunnel router addresses are included in the second message received from the tunnel service support server, the two or more addresses of tunnel routers are sequentially recorded in the second message according to priorities of the two or more tunnel routers.

15. The method of claim 14, wherein the second message including the tunnel router address includes at least type information indicating a type of information included in the message, and length information indicating a length of the included information.

16. The method of claim 14, wherein the tunnel service server is one of the at least one tunnel router corresponding to the at least one tunnel router address.

17. The method of claim 14, wherein the generating the second message including the at least one tunnel router address comprises generating the second message according to an option provided by dynamic host configuration protocol version 6 (DHCPv6).

18. The method of claim 14, wherein the generating then second message including the at least one tunnel router address comprises generating the second message according to a Router Advertisement option provided by neighbor discovery for Internet protocol version 6 (NDIPv6).

19. The method of claim 14, wherein the at least one tunnel router is a router transforming a packet generated by the user node and complying with the IPv6, into a packet complying with a protocol different from the IPv6.

20. A tunnel service support server providing an address of at least one tunnel router providing a tunneling function to a user node, the tunnel service support server comprising:
a data storage unit which stores at least one tunnel router address;
a communication unit which receives a message requesting at least one tunnel router address by and originating from the user node; and
a control unit which according to the message input from the communication unit, reads the at least one tunnel router address stored in the data storage unit, generates a response message including the at least one tunnel router address, and controls the communication unit such that the response message including the at least one tunnel router address is transmitted to the user node,
wherein packets to be tunneled to the at least one tunnel router originate from the user node,
wherein the tunnel service support server provides at least one tunnel router address, as an address of a corresponding tunnel router different from an address of the user node, providing a tunnel service to the user node based on the address of the user node, and
wherein the user node is a node supporting Internet protocol version 6 (IPv6) function,
wherein when two or more tunnel router addresses are included in the response message transmitted to the user node, the two or more addresses of tunnel routers are sequentially recorded in the response message according to priorities of the two or more tunnel routers.

21. The server of claim 20, wherein the response message including the tunnel router address includes at least type information indicating a type of information included in the response message, and length information indicating a length of the included information.

22. The server of claim 20, wherein the tunnel service server is one of the at least one tunnel router.

23. The server of claim 20, wherein the response message including the tunnel router address is generated by using an option provided by dynamic host configuration protocol version 6 (DHCPv6).

24. The server of claim 20, wherein the response message including the tunnel router address is generated by using Router Advertisement option provided by neighbor discovery for Internet protocol version 6 (NDIPv6).

25. The server of claim 20, wherein the at least one tunnel router is a router transforming a packet generated by the user node and complying with the IPv6, into another packet complying with a protocol different from the IPv6.

26. A non-transitory computer readable recording medium having embodied thereon a computer executable program for executing a method of setting an address of at least one tunnel router providing a tunneling function in a user node, wherein the method comprises:

transmitting, by and originating from the user node, a first message requesting at least one tunnel router address to a tunnel service support server;
receiving, by the user node, a second message including at least one tunnel router address from the tunnel service support server; and
storing the at least one tunnel router address included in the received second message,
wherein packets to be tunneled to the at least one tunnel router originate from the user node,
wherein the tunnel service support server provides at least one tunnel router address, as an address of a corresponding tunnel router different from an address of the user node, providing a tunnel service to the user node based on the address of the user node, and
wherein the user node is a node supporting Internet protocol version 6 (IPv6) function,
wherein when two or more tunnel router addresses are included in the second message received from the tunnel service support server, the two or more addresses of tunnel routers are sequentially recorded in the second message according to priorities of the two or more tunnel routers.

27. A non-transitory computer readable recording medium having embodied thereon a computer executable program for executing a method of providing an address of at least one tunnel router providing a tunneling function to a user node, in a tunnel service support server, wherein the method comprises:
receiving a first message requesting at least one tunnel router address by and originating from the user node;
generating a second message including the at least one tunnel router address; and transmitting the generated second message to the user node,
wherein packets to be tunneled to the at least one tunnel router originate from the user node,
wherein the tunnel service support server provides at least one tunnel router address, as an address of a corresponding tunnel router different from an address of the user node, providing a tunnel service to the user node based on the address of the user node, and
wherein the user node is a node supporting Internet protocol version 6 (IPv6) function,
wherein when two or more tunnel router addresses are included in the second message received from the tunnel service support server, the two or more addresses of tunnel routers are sequentially recorded in the second message according to priorities of the two or more tunnel routers.

28. A communication method comprising:
receiving address information, by a user node, corresponding to at least one terminal from a predetermined server, wherein the terminal provides a tunneling function to setup a tunnel between nodes in second networks via a first network; and
transmitting a packet, by and originating from a user node, to the terminal according to the received address information, wherein the packet is to be transmitted to a predetermined node in the second network via the first network,
wherein the predetermined server provides at least one tunnel router address, as an address of a corresponding tunnel router different from an address of the user node, providing a tunnel service to the user node based on the address of the user node, and
wherein the user node is a node supporting Internet protocol version 6 (IPv6) function, wherein when two or more tunnel router addresses are included in a response message transmitted to the user node, the two or more addresses of tunnel routers are sequentially recorded in the response message according to priorities of the two or more tunnel routers.

29. The method of claim 28, wherein the first network is an IPv4 network, and the second network is an IPv6 network.

30. The method of claim 29, wherein the address information is the terminal's IPv6 address.

31. The method of claim 28, wherein the predetermined server is a DHCPv6 server.

32. The method of claim 31, wherein the address information is received from the DHCPv6 server using DHCPv6 option information.

33. A communication apparatus comprising:
a control unit of a user node extracting an address information corresponding to at least one terminal from a predetermined server, wherein the terminal provides a tunneling function to setup a tunnel between nodes in second networks via a first network; and
a communication unit of a user node originating and transmitting a packet to the terminal according to the obtained address information, wherein the packet is to be transmitted to a predetermined node in the second network via the first network,
wherein the predetermined server provides at least one tunnel router address, as an address of a corresponding tunnel router different from an address of the user node, providing a tunnel service to the user node based on the address of the user node, and
wherein the user node is a node supporting Internet protocol version 6 (IPv6) function,
wherein when two or more tunnel router addresses are included in a response message transmitted to the user node, the two or more addresses of tunnel routers are sequentially recorded in the response message according to priorities of the two or more tunnel routers.

34. The communication apparatus of claim 33, wherein the first network is an IPv4 network, and the second network is an IPv6 network.

35. The communication apparatus of claim 34, wherein the address information is the terminal's IPv6 address.

36. The communication apparatus of claim 33, wherein the predetermined server is a DHCPv6 server.

37. The communication apparatus of claim 36, wherein the control unit receives the address information by way of a message from the DHCPv6 server, and the message is generated using DHCPv6 option information by the DHCPv6 server.

* * * * *